E. J. FRANKLIN.
ATOMIZER.
APPLICATION FILED JAN. 16, 1913.
1,102,034.
Patented June 30, 1914.
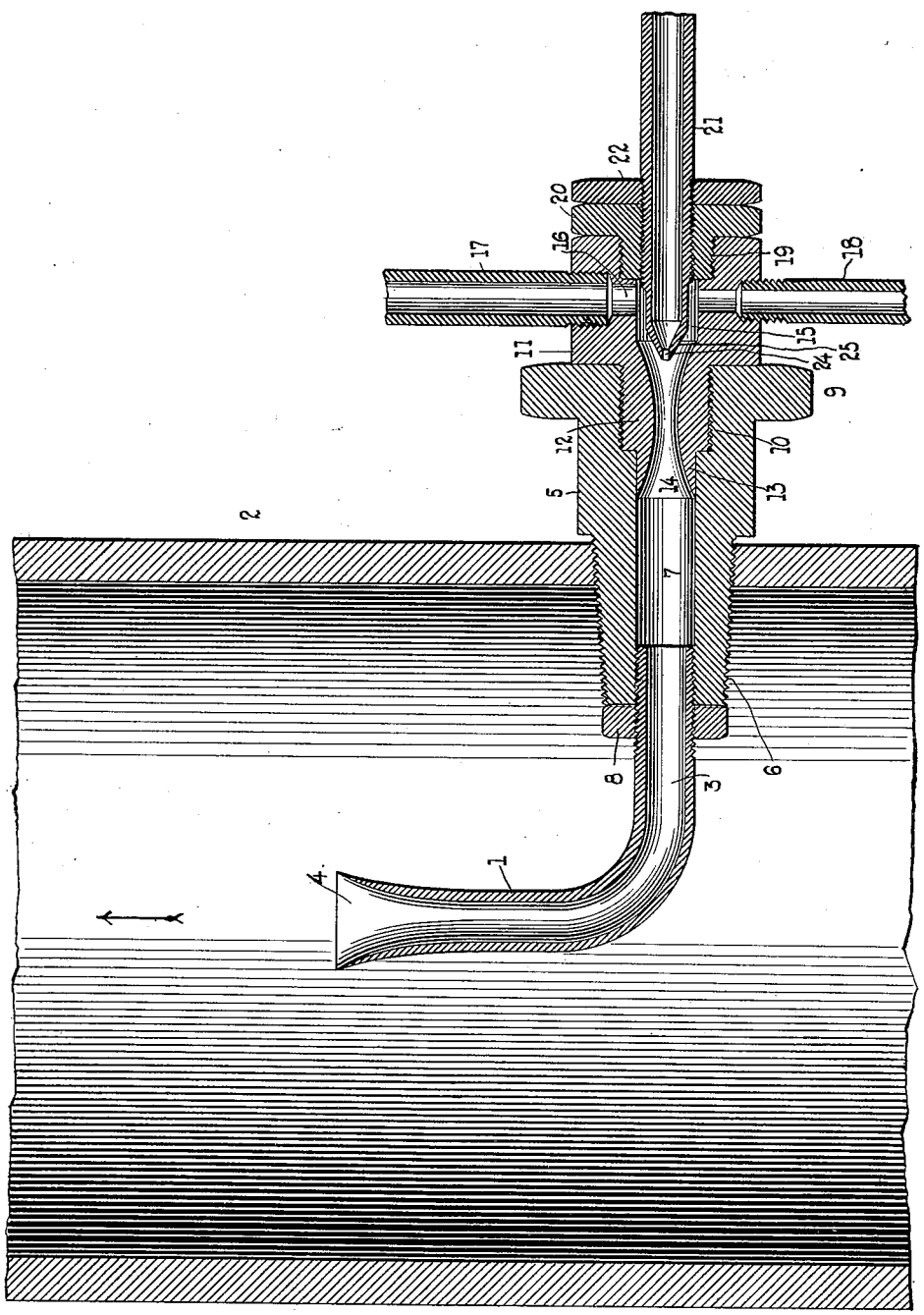
WITNESSES
INVENTOR
Edward J. Franklin.
BY
ATTORNEYS

UNITED STATES PATENT OFFICE.

EDWARD JOSEPH FRANKLIN, OF SALT LAKE CITY, UTAH.

ATOMIZER.

1,102,034.  Specification of Letters Patent.  Patented June 30, 1914.

Application filed January 16, 1913. Serial No. 742,428.

*To all whom it may concern:*

Be it known that I, EDWARD J. FRANKLIN, a citizen of the United States, and a resident of Salt Lake City, in the county of Salt Lake and State of Utah, have invented a new and Improved Atomizer, of which the following is a full, clear, and exact description.

My invention relates to an atomizer for the purpose of supplying lubricant to steam, gas, air or other engines, and the object thereof is to provide an atomizer which will have a spraying nozzle located inside of the main tube so that the lubricant can be divided and distributed before it issues from the outlet. This outlet is preferably located in the conduit through which the motive agent is supplied to the engine, and is so located that it faces the direction in which the motive agent is flowing.

Reference is to be had to the accompanying drawings, forming a part of this specification, in which the figure is a longitudinal sectional view showing my atomizer mounted in position.

I mount my atomizer 1 in such a position that the outlet end will be located on the inside of a motive agent conduit 2. The atomizer will have a bore 3 which terminates in a flaring mouth 4, this mouth intersecting with the outer surface so as to form an acute edge which surrounds the outlet opening. The tube having the bore 3 is bent in the form of an elbow, and the inlet end is screw-threaded and is mounted in a bushing 5. This bushing has a cone-shaped threaded end 6 which engages a screw-threaded opening in the side of the conduit 2, and a lock nut 8 is employed to hold the tube having the bore 3 securely in the bushing 5. This bushing has a bore 7 of the same dimension as the outside diameter of the delivery tube 1.

At its end on the outside of the conduit 2 the bushing 5 is shaped to provide a wrench hold 9, and the bore 7 is enlarged to form a threaded passage 10. This threaded passage is separated from the main passage 7 by means of a shoulder and it serves to engage and hold a bushing 11 having a threaded nipple 12 which screws into the bore 10, and a boss 13 projecting from the end of the nipple 12 and forming a shoulder which abuts against the shoulder between the threaded section 10 and the bore 7, this boss being of the same diameter as the bore 7 and fitting snugly into the ends of the same.

The bushing 11 has a bore 14 extending through its inner end, this bore 14 being of less diameter in the middle adjacent the longitudinal center of the nipple 12, and flaring in both directions, as shown, until its diameter becomes equal to that of the bore 7. This bore 14 merges at its outer end into a cylindrical bore 15 which communicates with transversely-extending passages 16 which are enlarged to form screw-threaded openings to receive a lubricant supply pipe 17 and a drain pipe 18. The last-named pipe may also be used as a blow-off dry cock or supply pipe communication if desired.

The bore 15 is enlarged at the outer end of the bushing 11 to form a screw-threaded opening 19 to receive a gland 20. This gland has a threaded bore extending centrally therethrough to receive a tube which extends into the bore 15 and has a cone-shaped end 23 provided with an atomizer opening 24, this opening being located inside of the outer flaring end of the bore 14. A suitable lock nut 22 may be employed to hold the gland 20 and the tube 21 together, and it will be seen that the position of the tube 21 and the atomizer opening 24 may be adjusted simply by loosening the gland 20 and nut 22.

The action of my atomizer will be apparent. Lubricant will be supplied in through the tube 17, the tube 18 being closed, and steam, air or some other vapor will be supplied under pressure to the pipe 21 and issue at a high velocity from the opening 24. The breaking up and distributing of the lubricating material, which may be oil, powdered graphite, mica or almost any lubricating material, is thus effected inside of the atomizer, and particularly within the bore 14, which acts as an atomizing and mixing chamber. The lubricant thus passes into the bore 7 and thence to the bore 3 and out through the flaring opening 4, spreading around all sides of the interior of the conduit 2 and mixing uniformly and efficiently with the motive agent traveling therein to the point where it is to be utilized. Normally I prefer to use the fluid under pressure which is supplied to the tube 21 at a higher temperature than the temperature of the motive agent in the pipe 2.

It will be noted that the flaring outlet 4 is located in the center of the conduit 2 and it delivers in the same direction as that in which the motive agent is passing. The shape of the nozzle 4 causes the atomized lubricant to spread out when it issues from the atomizer tube 1, so that it becomes distributed through the mass of the motive agent, and when carried to the parts of the motor in which the motive agent is used it will effect a very efficient lubrication. The degree of flaring of the opening 4 can of course be altered to suit conditions.

I wish to have it understood that the above description is illustrative only and I do not care to be limited to the exact details shown and described, but reserve to myself the right to make such changes in the shape, size and arrangement of the parts as fairly fall within the scope and spirit of my invention.

Having thus described my invention, I claim as new and desire to secure by Letters Patent:

1. The combination of a bushing having a threaded end to enable the same to be mounted in the wall of a motive agent conduit, said bushing having a bore therethrough, an elbow-shaped tube carried by said bushing and having a flaring end opening in the direction of flow of the motive agent in said conduit, a bushing mounted in the outer end of the first bushing and having a bore contracted in the middle and enlarged at the ends, means for admitting lubricant to the bore in said second bushing, means for draining the said second bushing, and means comprising a tube having a cone-shaped end and a restricted outlet carried by the second bushing in line with the bore therein, said tube conveying fluid under pressure to the bore to atomize the lubricant in its passage through the first bushing and the tube carried thereby to the outlet thereof.

2. In an atomizer, the combination of a bushing provided with a bore, said bore being contracted at the middle portion thereof and enlarged at the ends, a nozzle for discharging into said bore, a tubular member communicating with said bushing and bent, said tubular member being provided with a flaring end, and with an opening which is a continuation of the bore of said tubular member, the axis of said flaring end extending in the general direction of a conduit into which said tubular member discharges, means for supplying lubricant to said bore, and means for supplying fluid under pressure to said bore and to divide said lubricant.

3. In an atomizer the combination of a bushing provided with a bore, said bore being contracted at its middle and enlarged at its ends, a nozzle for discharging into said bore, a second bushing connected with said first mentioned bushing and supporting the latter, a conduit into which said second mentioned bushing extends, and a tubular member connected with said second mentioned bushing and bent to extend in the general direction of flow of a motive fluid within said conduit, said tubular member being provided with a flaring end, and with a central opening, said opening being a prolongation of the bore of said tubular member.

4. In an atomizer, a bushing adapted to be mounted in a motive agent conduit and having a bore, the outer end of which is enlarged, a bent tube secured to the inner end of the bushing and having a flaring end, a second bushing secured in the first-bushing and having at its inner end a bore which is contracted at its middle, and at its outer end a cylindrical bore, the outer end of which is enlarged, said second bushing having transverse openings leading into the cylindrical bore thereof, a lubricant supply pipe secured in one of the openings, a drain pipe secured in the other opening, a gland in the outer enlarged portion of the bore of the second bushing, and a fluid pressure tube having a cone shaped end and extending through the gland with its end projecting into the outer end of the inner bore of the second bushing.

In testimony whereof I have signed my name to this specification in the presence of two subscribing witnesses.

EDWARD JOSEPH FRANKLIN.

Witnesses:
ESTHER F. FRANKLIN,
H. EVERETT CHARLTON.

---

Copies of this patent may be obtained for five cents each, by addressing the "Commissioner of Patents, Washington, D. C."